United States Patent [19]

Kawauchi et al.

[11] Patent Number: 5,265,471
[45] Date of Patent: Nov. 30, 1993

[54] SENSOR SUPPORTING STRUCTURE FOR AN ACCELEROMETER

[75] Inventors: Hidetoshi Kawauchi; Akira Niino, both of Tokyo, Japan

[73] Assignee: Japan Aviation Electronics Industry Limited, Tokyo, Japan

[21] Appl. No.: 863,969

[22] Filed: Apr. 6, 1992

[30] Foreign Application Priority Data

Apr. 15, 1991 [JP] Japan .................. 3-25018[U]

[51] Int. Cl.5 .................................................. G01D 1/02
[52] U.S. Cl. ........................................ 73/493; 248/637
[58] Field of Search ............ 73/493, 866.5, 431; 248/637, 309.1, 694

[56] References Cited

U.S. PATENT DOCUMENTS 5,097,172  3/1992  Becka .................. 248/637

Primary Examiner—Robert Raevis
Assistant Examiner—Michael Brock
Attorney, Agent, or Firm—Pollock, Vande Sande and Priddy

[57] ABSTRACT

In an accelerometer supporting structure a housing is formed by a cylindrical portion and a flange, and a positioning part whose outer diameter is greater than that of the cylindrical portion and whose length is shorter than the length of the cylindrical portion in the axial direction of the cylindrical portion, is formed in the outer periphery of the cylindrical portion in contiguity to the flange. The inner peripheral surface of the cylindrical portion and the outer peripheral surface of the cylindrical sensor part are fixed to each other by a fixing ring disposed therebetween at an axial distance from the flange. The sensor supporting structure is adapted to be mounted on a mount with the cylindrical portion received in a circular hole of the mount and the flange resting on the mount about the marginal edge of the circular hole and fixed to the mount.

1 Claim, 2 Drawing Sheets

SENSOR SUPPORTING STRUCTURE FOR AN ACCELEROMETER

BACKGROUND OF THE INVENTION

The present invention relates to a sensor supporting structure for an accelerometer.

In general, the sensor of an accelerometer is housed and supported in a cylindrical housing and mounted on an object for which an acceleration input thereinto is detected or measured. FIG. 1 shows the construction of this kind of sensor supporting structure 10 disclosed in Japanese Patent Application Laid-Open No. 311173/88. In a sensor part 11 of a cylindrical outward appearance, there is housed, for example, a known capacitance pick-off type acceleration sensor which detects, as a capacitance change, a displacement of a quartz plate spring which is caused by an input acceleration, or a known piezoelectric voltage detection type acceleration sensor which detects a voltage resulting from the deflection of a quartz plate caused by acceleration. The acceleration that is measured which is applied in the axial direction A of the sensor. A housing 12 is composed of a cylindrical portion 13 and a flange 14 formed integrally therewith on the outer periphery thereof, and the sensor part 11 is received in the cylindrical portion 13 coaxially therewith. There is provided a predetermined gap between the inner peripheral surface of the cylindrical portion 13 and the outer peripheral surface of the sensor part 11, and the cylindrical portion 13 and the sensor are fixed by a ring 15.

The acceleration sensor supporting structure 10 has its cylindrical portion 13 received in a circular hole 17 made in a mount 16 with the flange 14 resting on the mount 16 along the marginal edge of the hole 17 and fixed thereto by screws 19.

Under environmental conditions in which the mount 16 undergoes a drastic temperature change, a thermal stress is produced between the mount 16 and the housing 12 of the sensor supporting structure 10 due to a difference between their thermal expansion coefficients. The conventional sensor supporting structure 10 has an arrangement which prevents the thermal stress from being transmitted to the sensor part 11 and adversely affecting its operation.

Since the ring 15 for fixing the sensor part 11 to the housing 12 is located apart from the flange 14 of the housing 12 in its axial direction A as shown in FIG. 1, the thermal stress generated between the mount 16 and the flange 14 is not directly transmitted to the sensor part 11 but instead it is absorbed by an elastic deformation of the cylindrical portion 13 of the housing 12 as indicated by the broken lines in FIG. 2.

Moreover, it is conventional, with a view to mounting the sensor supporting structure 10 on the mount 16 with a high degree of accuracy, that the gap G1 between the interior surface of the circular hole 17 of the mount 16 and the outer peripheral surface of the cylindrical portion 13 of the support structure 10 is set to a minimum as long as the cylindrical portion 13 can be inserted in the circular hole 17.

Thus, the sensor supporting structure 10 of this kind is so designed as to prevent measurement of acceleration from being influenced by ambient temperature.

On the other hand, in the case of boring the earth vertically in oil-well drilling or the like through utilization of the fact that detected gravitational acceleration decreases as the axial direction of the sensor part 11 (the direction of the detection of acceleration) deviates from the vertical direction, an accelerometer is mounted on the drill to measure the gravitation acceleration. In an environment in which the mount 16 is subject to a great impact of, for example, 2000G, the conventional sensor supporting structure 10 is defective in that, when it is exposed to a great impact in its radial direction, the quartz plate held in the sensor part 11 is readily broken. The sensor supporting structure 10 is mounted by the flange 14 on the mount 16 as if it is suspended therefrom. Now, let it be assumed that an impact is applied to the sensor supporting structure 10 in a direction B perpendicular to the axial direction A of the sensor part 11. When the impact acceleration is small, it is attenuated by the cylindrical portion 13 of the housing 12 as in the case of the aforementioned absorption of thermal stress. When the impact acceleration is large, the situation occasionally arises where the cylindrical portion 13 collides against the mount 16 as depicted in FIG. 3 because the gap G1 between the circular hole 17 and the cylindrical portion 13 is small and a secondary impact is generated by the collision and transmitted to the sensor part 11, resulting in breakage of the quartz plate (not shown) in the sensor part 11.

The secondary impact by the collision is complex in direction as compared with the impact acceleration applied to the mount 16, and in the case where the impact acceleration is continually applied and the secondary impact is also continually caused and accelerations are superimposed, the resulting secondary impact acceleration becomes greater than the applied impact acceleration.

One possible solution to this problem is to increase the gap G1 between the circular hole 17 and the cylindrical portion 13 in FIG. 1 to avoid the collision of the cylindrical portion 13 against the mount 16 due to the impact acceleration. In this instance, however, since the accuracy of mounting the support structure 10 on the mount 16 is impaired and since it is difficult to machine the mounting surface 18 of the mount 16 completely flat, the axial direction A of the sensor part 11 changes relative to the direction of acceleration to be measured each time the sensor supporting structure 10 is mounted and dismounted, that is, the reproducibility of the mounting position of the structure 10 is impaired, making it impossible to measure acceleration with accuracy.

SUMMARY OF THE INVENTION

It is therefore an object of the present invention to provide an acceleration sensor supporting structure which is free from the influence of ambient temperature, which has a construction wherein even if exposed to a great impact or shock, its cylindrical portion will not collide with the mount, that is, no secondary impact or shock will be generated, and which retains good reproducibility in its mounting position even after being repeatedly mounted and dismounted.

In the acceleration sensor supporting structure according to the present invention wherein a sensor part of a cylindrical outward appearance is supported in a cylindrical housing coaxially therewith, the housing is composed of a cylindrical portion and an edge flange extended about the periphery of the cylindrical portion so that the housing is mounted on a mount with the cylindrical portion received in a circular hole of the mount and the edge flange resting on and fixed to the mount about the marginal edge of the hole, the inner peripheral surface of the cylindrical portion and the outer peripheral surface of the sensor part are fixed relative to each other by a fixing ring disposed therebetween at the farthest possible position from the flange in the axial direction of the housing, there is formed in the outer peripheral surface of the cylindrical portion a positioning part contiguous to the edge flange, the outer diameter of the positioning part being greater than the outer diameter of the cylindrical portion and the length of the positioning part in its axial direction being smaller than the distance between the flange and the fixing ring.

With such a sensor supporting structure according to the present invention, thermal stress generated between the mount and the flange is absorbed by the cylindrical portion as in the conventional sensor supporting structure and the collision of the cylindrical portion against the mount by impact is avoided because the diameter of the cylindrical portion is smaller than that of the positioning part. In addition, the sensor supporting structure can be mounted on the mount with a high degree of accuracy, i.e. with good reproducibility, as is the case with the conventional sensor supporting structure.

DESCRIPTION OF THE PREFERRED EMBODIMENT

Figure 1:
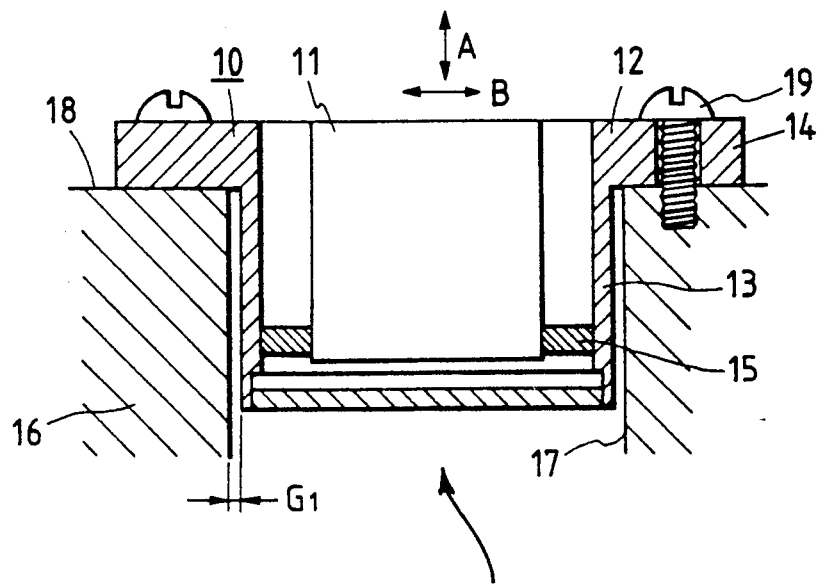
FIG. 1 is a longitudinal-sectional view schematically showing how a conventional accelerometer supporting structure is mounted on a mount.
Figure 2:
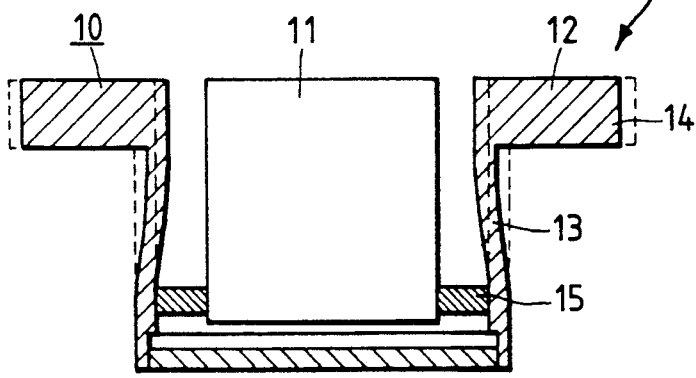
FIG. 2 is a diagram for explaining a thermal stress absorbing effect of the conventional sensor supporting structure.
Figure 3:
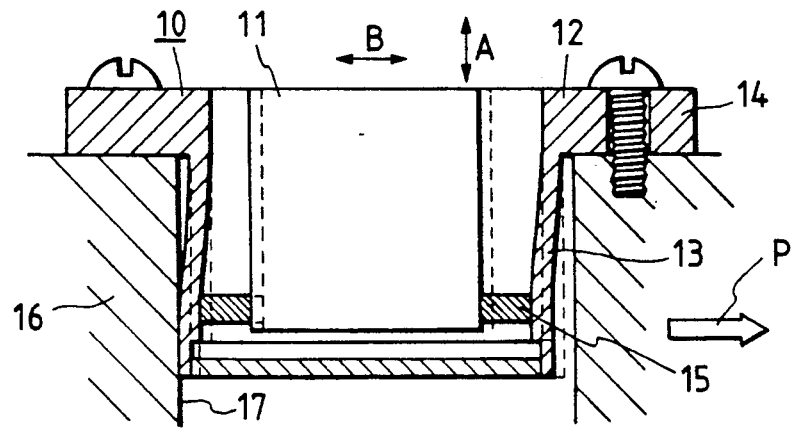
FIG. 3 is a diagram for explaining the state in which an impact acceleration is applied to the conventional sensor supporting structure.
Figure 4:
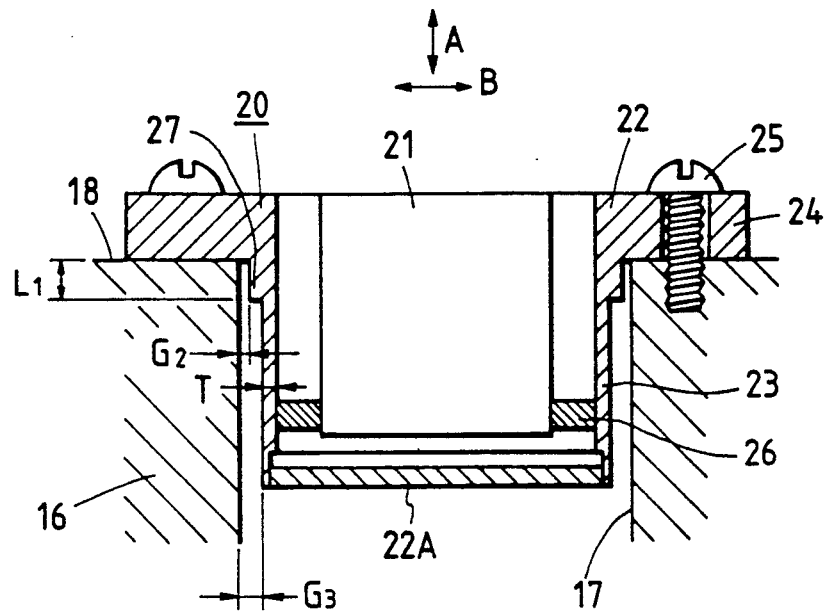
FIG. 4 is a longitudinal-sectional view illustrating the state in which the sensor supporting structure according to an embodiment of the present invention is on a mount.
Figure 5:
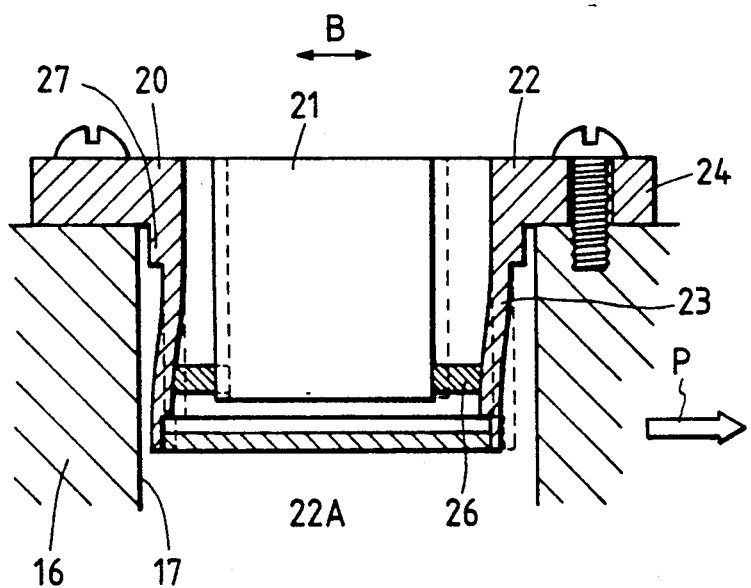
FIG. 5 is a diagram for explaining the state in which an impact acceleration is applied to the sensor supporting structure shown in FIG. 4.

Turning now to FIGS. 4 and 5, an embodiment of the present invention will hereinafter be described. FIG. 4 shows how the sensor supporting structure according to the present invention, indicated generally by 20, is mounted on the mount 16. A sensor part 21 of a known construction has a cylindrical outward appearance and is supported in a cylindrical housing 22 coaxially therewith. The housing 22 is composed of a cylindrical portion 23 and an edge flange 24 extended about the periphery of the cylindrical portion 23 at one end thereof. The housing 22 is made of permalloy or stainless steel, for instance. The cylindrical portion 23 is open at the one end where the edge flange 24 is provided and is closed at the other end with a lid 22A.

The sensor supporting structure 20 is mounted on the mount 16, with the cylindrical portion 23 received in the circular hole 17 in the mount 16 and the flange 24 held in contact with the mounting surface 18 of the mount 16 and fixed thereto by means of screws 25.

The inner peripheral surface of the cylindrical portion 23 and the outer peripheral surface of the sensor part 21 are spaced a predetermined distance apart and are bonded and fixed to each other by a metallic ring 26 which is disposed apart from the flange 24 in the axial direction A.

In the outer peripheral surface of the cylindrical portion 23 there is formed a positioning part 27 which is contiguous to the flange 24 and has an outer diameter greater than that of the cylindrical portion 23. The length L1 of the positioning part 27 in the axial direction A is selected as small as possible within the range over which the sensor supporting structure 20 can be positioned relative to the circular hole 17. In order to reduce a stress which could be applied from flange 24 to the sensor part 21 through the wall of the cylindrical portion 23 and the fixing ring 26, the axial distance between the positioning part 27 and the fixing ring 26 is longer than the axial length $L_1$ of the positioning part 27. To increase the accuracy of mounting the sensor supporting structure 20 on the mount 16, a gap G2 between the outer peripheral surface of the positioning part 27 and the inner surface of the circular hole 17 is selected as small as possible.

The thickness T of the cylindrical portion 23 between the positioning part 27 and the fixing ring 26 is chosen such that displacement of the flange 24 in its radial direction by thermal stress can be prevented from being transmitted to the fixing ring 26. A gap G3 between the outer peripheral surface of the cylindrical portion 23 and the inner surface of the circular hole 17 is so chosen that the cylindrical portion 23 will not contact the inner wall of the hole 17 due to a predictable maximum impact in the radial direction B.

With the structure of this embodiment, the thermal stress, which is generated between mount 16 and the flange 24 under severe environmental conditions in which temperature undergoes a drastic change, is absorbed by the cylindrical portion 23 and hence is not transmitted to the sensor part 21, and in an environment in which the mount 16 is subject to a great impact, the cylindrical portion 23 will not collide against the mount 16 as shown in FIG. 5, and hence no secondary impact or shock will be generated. Moreover, the provision of the positioning part 27 in the outer peripheral surface of the cylindrical portion 23 will enable the sensor supporting structure to be mounted with a high degree of accuracy.

As described above, the sensor supporting structure according to the present invention appreciably reduces the possibility of the sensor part being broken by a great impact applied to the sensor structure at right angles to the direction in which it detects acceleration. Furthermore, the sensor supporting structure of the present invention ensures accurate measurement of acceleration free from the influence of ambient temperature. Also the reproducibility of the mounting position of the sensor supporting structure on the mount is so excellent that even if the sensor supporting structure is repeatedly mounted on and dismounted from the mount, the axial direction of the supporting structure does not change with respect to the direction of acceleration to be measured, thus permitting accurate measurement of acceleration.

It will be apparent that many modifications and variations may be effected without departing from the scope of the novel concepts of the present invention.

What is claimed is:

1. An accelerometer supporting structure adapted to be mounted in a circular hole of a mount, comprising:
   a sensor part of a cylindrical outward appearance;
   a cylindrical housing for supporting said sensor part coaxially therewith, said housing including a cylindrical portion for housing therein said sensor part and an edge flange extended about the periphery of said cylindrical portion;

fixing means for attaching said flange to said mount with said cylindrical portion received in said circular hole of said mount and said edge flange resting on said mount;

a fixing ring for fixing said sensor part to said cylindrical portion of said housing, said fixing ring being disposed between an inner peripheral surface of said cylindrical portion and an outer peripheral surface of said sensor part at a distance from said flange in the axial direction of said cylindrical portion; and a positioning part in an outer peripheral surface of said cylindrical portion in contiguity to said flange, the outer diameter of said positioning part being larger than the outer diameter of said cylindrical portion and the length of said positioning part in the axial direction of said cylindrical portion being smaller than the distance between said positioning part and said fixing ring.

* * * * *